(12) United States Patent
Gander

(10) Patent No.: US 8,465,035 B2
(45) Date of Patent: Jun. 18, 2013

(54) QUICK CHANGE TRAILER AXLE HUB

(76) Inventor: Eric Gander, Gauteng (ZA)

(*) Notice: Subject to any disclaimer, the term of this patent is extended or adjusted under 35 U.S.C. 154(b) by 78 days.

(21) Appl. No.: 13/090,641

(22) Filed: Apr. 20, 2011

(65) Prior Publication Data
US 2011/0260526 A1    Oct. 27, 2011

(30) Foreign Application Priority Data
Apr. 21, 2010   (ZA) .................................. 10/0060

(51) Int. Cl.
*B60G 9/04*   (2006.01)
(52) U.S. Cl.
CPC .................................. *B60G 9/04* (2013.01)
USPC ...................... 280/124.1; 301/124.1
(58) Field of Classification Search
CPC ........................................................ B60G 9/04
USPC .................. 280/124.1, 124.11, 124.156, 503, 280/124.135; 301/124.1, 111.03
See application file for complete search history.

(56) References Cited

U.S. PATENT DOCUMENTS

| | | | | |
|---|---|---|---|---|
| 4,135,766 A * | 1/1979 | Trautloff | | 301/114 |
| 4,768,839 A * | 9/1988 | Spindler | | 301/124.1 |
| 5,645,294 A * | 7/1997 | Ward | | 280/86.75 |
| 5,727,850 A * | 3/1998 | Masclet | | 301/111.03 |
| 5,833,026 A * | 11/1998 | Zetterstrom et al. | | 180/360 |
| 6,086,162 A * | 7/2000 | Pinch et al. | | 301/124.1 |
| 6,299,259 B1 * | 10/2001 | MacKarvich | | 301/127 |
| 6,357,769 B1 * | 3/2002 | Omundson et al. | | 280/124.109 |
| 6,402,258 B1 * | 6/2002 | Martinez | | 301/111.04 |
| 6,409,280 B1 * | 6/2002 | Mair | | 301/105.1 |
| 6,565,159 B1 * | 5/2003 | Kosak | | 301/132 |
| 6,752,235 B1 * | 6/2004 | Bell et al. | | 180/360 |
| 6,948,782 B2 * | 9/2005 | Porter et al. | | 301/105.1 |
| 7,229,137 B2 * | 6/2007 | Roberts et al. | | 301/124.1 |
| 7,407,045 B2 * | 8/2008 | Hofmann et al. | | 188/382 |
| 7,445,220 B2 * | 11/2008 | von Mayenburg et al. | | 280/124.116 |
| 7,658,391 B1 * | 2/2010 | Wurm | | 280/80.1 |
| 2005/0168056 A1 * | 8/2005 | Roberts et al. | | 301/124.1 |
| 2006/0027992 A1 * | 2/2006 | Bordini | | 280/124.156 |
| 2006/0124411 A1 * | 6/2006 | Redgrave | | 188/218 XL |
| 2008/0150350 A1 * | 6/2008 | Morrow et al. | | 301/124.1 |
| 2009/0033054 A1 * | 2/2009 | Foster | | 280/124.1 |
| 2009/0101457 A1 * | 4/2009 | Gonska et al. | | 188/18 R |
| 2009/0178875 A1 * | 7/2009 | Bowers | | 180/359 |
| 2011/0115185 A1 * | 5/2011 | Csik | | 280/124.125 |
| 2011/0169240 A1 * | 7/2011 | Schreiner et al. | | 280/124.11 |
| 2011/0210527 A1 * | 9/2011 | Elliott et al. | | 280/124.11 |
| 2011/0260526 A1 * | 10/2011 | Gander | | 301/111.03 |
| 2011/0272905 A1 * | 11/2011 | Mackin et al. | | 280/124.11 |
| 2011/0285101 A1 * | 11/2011 | Henksmeier et al. | | 280/124.11 |
| 2012/0200055 A1 * | 8/2012 | Alexander et al. | | 280/124.11 |

* cited by examiner

*Primary Examiner* — Joseph Rocca
*Assistant Examiner* — Karen Beck
(74) *Attorney, Agent, or Firm* — Wenderoth, Lind & Ponack, LLP

(57) ABSTRACT

An axle-and-hub assembly for a trailer which includes an axle with opposing ends, first and second connecting devices respectively positioned at the opposing ends of the axle, and first and second hub arrangements which are removably secured to the first and second connecting devices.

7 Claims, 3 Drawing Sheets

QUICK CHANGE TRAILER AXLE HUB

BACKGROUND OF THE INVENTION

This invention relates to an axle-and-hub assembly for a trailer.

An axle-and-hub assembly couples a trailer's wheels to a body of the trailer and allows the wheels to rotate about an axis which is aligned with the axle which, in turn, remains stationary.

The axle-and-hub assembly bears the entire weight of the trailer and its payload and, additionally, is exposed to acceleration and braking forces. In order to withstand these forces the axle-and-hub assembly typically includes an integral hub which is strong and durable. A disadvantage of this type of construction though is that the entire assembly must be discarded if the hub-end of the assembly becomes damaged. Not only is this expensive but the removal of the damaged axle-and-hub assembly from the body of a trailer is a laborious task which results in considerable downtime.

An object of the present invention is to provide an axle-and-hub assembly which, at least partly, addresses the aforementioned problems.

SUMMARY OF INVENTION

The invention provides an axle-and-hub assembly, for a trailer, which includes an axle with opposing ends, first and second connecting devices respectively positioned at the opposing ends of the axle, and first and second hub arrangements which are respectively removably secured to the first and second connecting devices.

Each connecting device may be in any suitable form and preferably is a steel flange. Each flange may be welded, and interference fitted, to a respective end of the axle.

Each flange may include a plurality of holes which are regularly spaced from one another on a circle centred on an axis of the axle.

Each hub arrangement may include a plate which can be directly connected to a respective flange. The plate and the flange may include complementary interengageable formations. For example the flange may include an axially extending boss and the plate may include an axially extending recess which is complementary in shape and size to the boss. The plate on the hub arrangement may otherwise be substantially identical in shape and size to the flange with which it is engaged.

BRIEF DESCRIPTION OF THE DRAWINGS

The invention is further described by way of example with reference to the accompanying drawings in which.

DESCRIPTION OF PREFERRED EMBODIMENT

Figure 1:
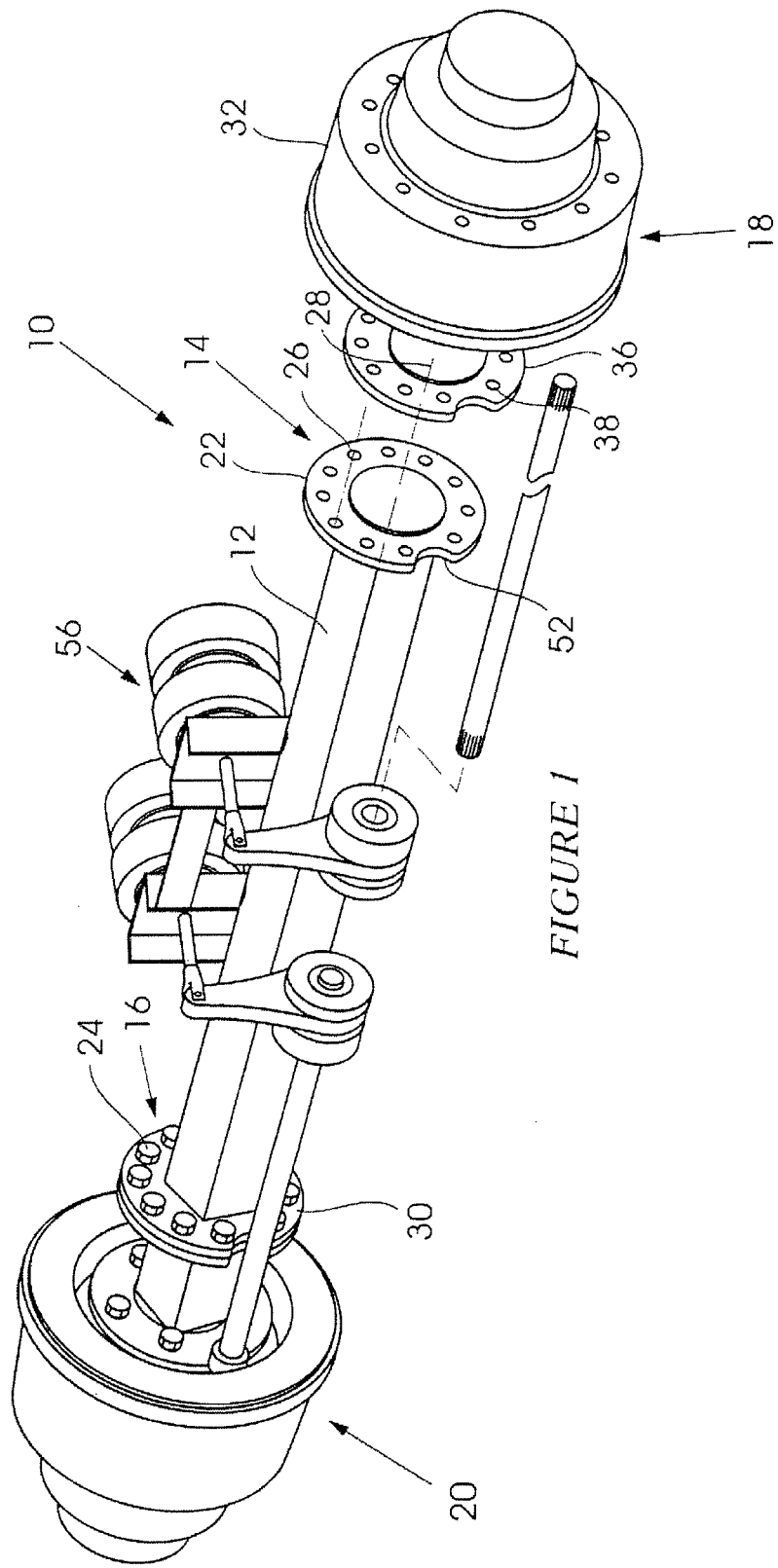
FIG. 1 is a perspective view of a trailer axle-and-hub assembly according to the invention.

FIG. 1 of the accompanying drawings illustrates an axle-and-hub assembly 10 which includes an axle 12 with opposed ends 14 and 16 respectively and hub arrangements 18 and 20 engaged with the respective axle ends 14 and 16.

The axle 12, which in this example is square in cross section, includes first and second connecting flanges 22 and 24 respectively which are interference fitted, and welded, to the axle 12. Each flange is drilled with a number of holes 26 which are regularly spaced from each other and which are positioned on a circle centred on an axis 28 which is aligned with the axle. A knurled stud 30 is press-fitted to each respective hole 26.

The hub arrangements 18 and 20 are identical. For this reason only the construction of the hub arrangement 18 is described. The hub arrangement 18 includes a hub 32 which is mounted to a stub axle 34. A steel plate 36 is fixed to what, in use, is an inner end of the stub axle 34. The steel plate 36 is for all practical purposes the same as the flange 22 and has holes 38 which are brought into register with respective holes 26. These holes are however clearance holes and enable shanks of the studs 30 to pass through the holes.

Figure 2:
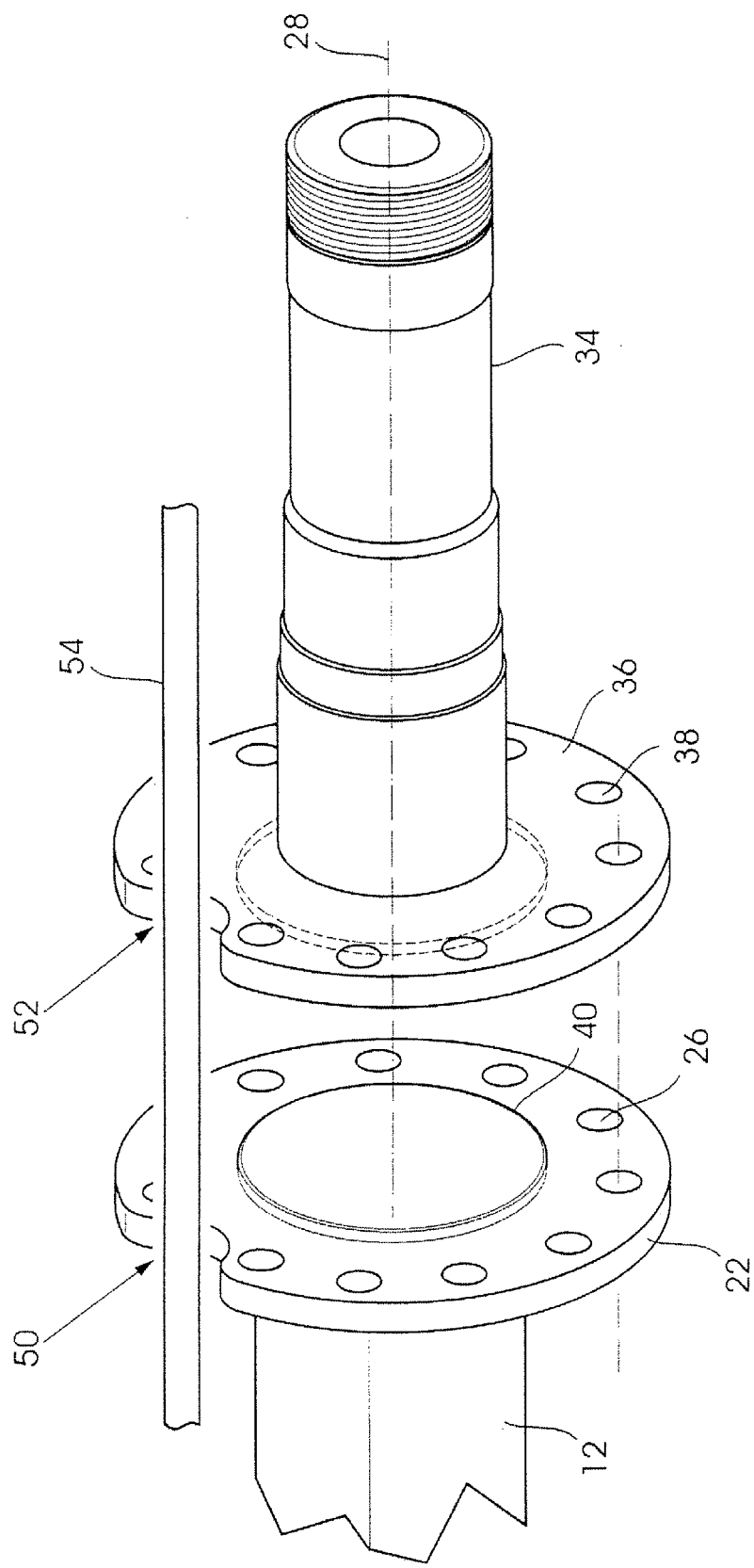
FIG. 2 shows part of one end of the axle-and-hub assembly of FIG. 1 in an exploded configuration.
Figure 4:
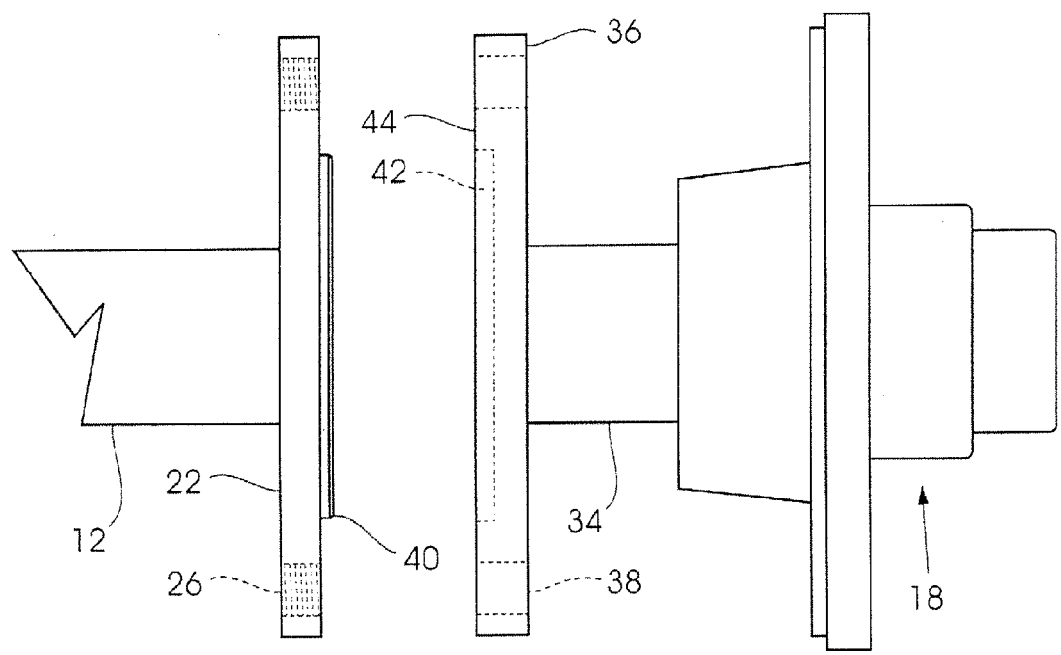
FIG. 4 is a side view of components at one end of the axle-and-hub assembly in FIG. 1 in an exploded configuration.

As is clearly shown in FIGS. 2 and 4 the flange 22 has an axially extending circular boss 40 at an inner perimeter. The plate 36 has an axially extending recess 42, which is complementary in shape and size to the boss, on a surface 44 which opposes the flange 22. The recess 42 is designed to receive the boss 40 in a close fitting and aligned manner which ensures that the hub arrangement is correctly positioned and axially aligned with the axle. Studs 30 are then used to fix the flange to the plate in a secure manner.

The second end 16 of the axle is arranged and constructed in a similar manner.

Figure 3:
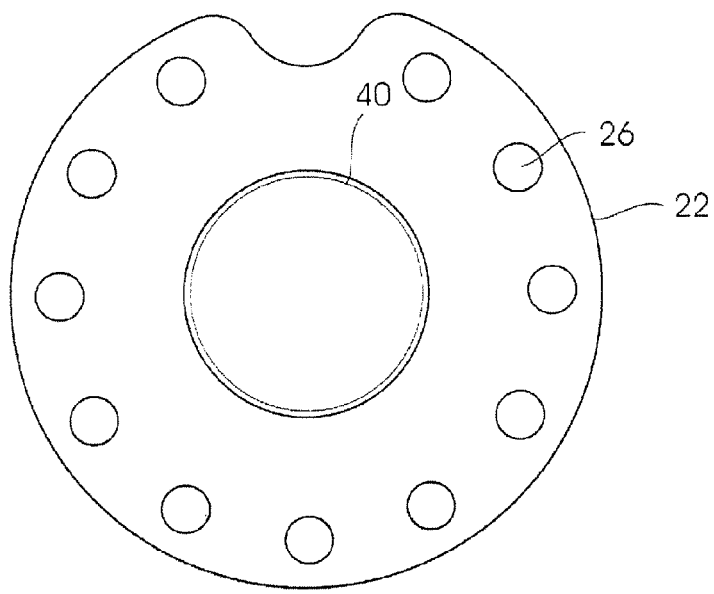
FIG. 3 shows a connecting flange used in the axle-and-hub assembly.

FIGS. 2 and 3 in particular show that the flange 22 has a recess 50 which is in register with a similarly shaped recess 52 in the connecting plate 36. This allows for the passage of an S-cam rod 54 which is connected between the hub 32 and a shock absorbing arrangement 56, of conventional construction, which is centrally located on the axle 12.

A principal benefit of the invention is that a damaged hub arrangement (18 or 20), can be replaced without removing the axle. This capability reduces the cost of repair and maintenance, and downtime.

The strength of the assembly is not compromised, an aspect which was verified by subjecting an axle, with a 12 ton load rating, to a test to evaluate, inter alia, the integrity of the flanged connections (22,36) under application of a quasi-static, vertical load representative of actual service conditions. Based on the rated static load of 12 ton and a vertical acceleration of 3g a compressive load, applied to the axle assembly, was increased to 36 ton. After the load was released an inspection of the assembly showed that there was no damage nor permanent deformation. The load was increased further and it was only at a loading of 62 ton that the assembly suffered damage.

The principles of the invention are applicable with equal effect to axles which are square or circular in cross section. The hub arrangement could be braked or unbraked.

The invention claimed is:

1. An axle-and-hub assembly for a trailer, the axle-and-hub assembly including:
   an axle having opposing ends;
   a first connecting flange and a second connecting flange positioned at the opposing ends of the axle, respectively;
   a first hub arrangement having a first plate that is directly and removably secured to the first connecting flange;
   a second hub arrangement having a second plate that is directly and removably secured to the second connecting flange; and a shock absorbing arrangement between the first and second hub arrangements, wherein the first plate and the first connecting flange are formed with respective recesses which are in register with each other and which allow for the passage of a first rod which is connected to the first hub arrangement and the shock absorbing arrangement, and wherein the second plate and the second connecting flange are formed with respective recesses which are in register with each other and which allow for the passage of a second rod which is connected to the second hub arrangement and the shock absorbing arrangement.

2. An axle-and-hub assembly according to claim 1, wherein the first connecting flange is welded, and interference fitted, to the respective end of the axle, and wherein the second connecting flange is welded, and interference fitted, to the respective end of the axle.

3. An axle-and-hub assembly according to claim 1, wherein the first plate and the first flange include complementary interengaging formations, and the second plate and the second flange include complementary interengaging formations.

4. An axle-and-hub assembly according to claim 2, wherein the first plate and the first flange include complementary interengaging formations.

5. An axle-and-hub assembly according to claim 4, wherein the second plate and the second flange include complementary interengaging formations.

6. An axle-and-hub assembly according to claim 3, wherein the first flange includes an axially extending boss and the first plate includes an axially extending recess which is complementary in shape and size to the axially extending boss of the first flange.

7. An axle-and-hub assembly according to claim 6, wherein the second flange includes an axially extending boss and the second plate includes an axially extending recess which is complementary in shape and size to the axially extending boss of the second flange.

* * * * *